United States Patent
Oblinger et al.

(10) Patent No.: US 10,167,785 B2
(45) Date of Patent: Jan. 1, 2019

(54) ELEMENT OF AN EXHAUST LINE COMPRISING VALVE WITH ADDED STOPPERS

(71) Applicant: Faurecia Systemes D'Echappement, Nanterre (FR)

(72) Inventors: Benjamin Oblinger, Montbeliard (FR); Laurent Viardot, Hericourt (FR); Sebastien Royer, Dasle (FR); Gilbert Delplanque, Sochaux (FR)

(73) Assignee: Faurecia Systemes D'Echappement (FR)

( * ) Notice: Subject to any disclaimer, the term of this patent is extended or adjusted under 35 U.S.C. 154(b) by 44 days.

(21) Appl. No.: 15/278,069

(22) Filed: Sep. 28, 2016

(65) Prior Publication Data

US 2017/0089270 A1 Mar. 30, 2017

(30) Foreign Application Priority Data

Sep. 30, 2015 (FR) .................................... 15 59306

(51) Int. Cl.
| | | |
|---|---|---|
| *F01N 3/00* | (2006.01) | |
| *F02D 9/10* | (2006.01) | |
| *F01N 13/08* | (2010.01) | |
| *F01N 13/18* | (2010.01) | |
| *F01N 1/18* | (2006.01) | |
| *F16K 1/22* | (2006.01) | |
| *F16K 27/02* | (2006.01) | |

(52) U.S. Cl.
CPC ............. *F02D 9/1045* (2013.01); *F01N 1/18* (2013.01); *F01N 13/087* (2013.01); *F01N 13/1805* (2013.01); *F02D 9/101* (2013.01); *F16K 1/22* (2013.01); *F16K 1/222* (2013.01); *F16K 27/0218* (2013.01); *F01N 2240/36* (2013.01)

(58) Field of Classification Search
USPC ..................................... 60/272, 292, 293, 324
See application file for complete search history.

(56) References Cited

U.S. PATENT DOCUMENTS

| | | | | |
|---|---|---|---|---|
| 5,406,790 A | * | 4/1995 | Hirota ................ | B01D 53/0454 60/276 |
| 5,630,571 A | * | 5/1997 | Kipp ........................ | F02D 9/06 251/214 |
| 6,694,727 B1 | * | 2/2004 | Crawley ................. | F01N 3/025 251/63 |

(Continued)

FOREIGN PATENT DOCUMENTS

| | | |
|---|---|---|
| DE | 102011107024 A1 | 1/2013 |
| WO | 2015111334 A1 | 7/2015 |

OTHER PUBLICATIONS

French Searh Report dated Apr. 27, 2016.

*Primary Examiner* — Binh Q Tran
(74) *Attorney, Agent, or Firm* — Carlson, Gaskey & Olds, P.C.

(57) ABSTRACT

An exhaust line element comprises a valve body, a shutter, a pivot link connecting the shutter to the valve body, an upstream tube, and a downstream tube. At least one first stopper is attached on an inner surface of the valve body. The shutter abuts against the first stopper in the closing off position. The first stopper defines a longitudinal position of at least one of the upstream tube and the downstream tube relative to the valve body.

20 Claims, 6 Drawing Sheets

(56) References Cited

U.S. PATENT DOCUMENTS

| | | | | |
|---|---|---|---|---|
| 7,536,990 B2* | 5/2009 | Willats | ...................... | F02D 9/04 |
| | | | | 123/323 |
| 2009/0100834 A1* | 4/2009 | Sexton | .................. | F16K 31/535 |
| | | | | 60/602 |
| 2009/0126359 A1* | 5/2009 | Abram | ................... | F01N 13/08 |
| | | | | 60/324 |
| 2011/0265466 A1* | 11/2011 | Ikeda | ....................... | F02D 9/04 |
| | | | | 60/324 |

* cited by examiner

ELEMENT OF AN EXHAUST LINE COMPRISING VALVE WITH ADDED STOPPERS

CROSS-REFERENCE TO RELATED APPLICATIONS

This application claims priority to FR 15 59306, filed 30 Sep. 2015.

TECHNICAL FIELD

The present invention generally relates to exhaust line valves. More specifically, according to a first aspect, the invention relates to an exhaust line element, the element being of the type comprising a tubular valve body inwardly defining a passage for the exhaust gases, and the valve body having a longitudinal central axis. A shutter is positioned in the passage and a pivot link connects the shutter to the valve body, which is arranged such that the shutter is rotatable around a rotation axis between a first position closing off the passage and a second position freeing the passage. The valve body is inserted between an upstream tube and a downstream tube, and the passage fluidly connects the upstream tube to the downstream tube. At least one first stopper is attached on an inner surface of the valve body, and the shutter abuts against the first stopper in the first position.

BACKGROUND

One example of an exhaust line element is in particular known from DE 10 2011 100 238. This element is expensive. In this context, the invention aims to propose an exhaust line element that is less expensive and lighter.

SUMMARY

To that end, the invention relates to an exhaust line element of the aforementioned type, wherein the first stopper defines a longitudinal position of at least one of the upstream tube and the downstream tube relative to the valve body.

Thus, it is not necessary to produce machining in the valve body, which makes it possible to create stoppers provided to receive the upstream tube and/or the downstream tube. The manufacturing of the valve body is greatly facilitated, and a thinner tube can be used. This results in a reduced cost of the exhaust line element.

The assembly may further have one or more of the features described below, considered individually, or according to any technical possible combination(s): the exhaust line element comprises a second stopper attached on the inner surface of the valve body, the second stopper defining the longitudinal position of the other of the upstream tube and the downstream tube relative to the valve body; the first stopper is a plate comprising a main segment pressed against the inner surface, the main segment having a first rim, the shutter abutting against the first rim in the first position (closing off position); the first stopper comprises a main segment pressed against the inner surface and a first edge secured to the main segment, the first edge protruding toward the central axis relative to the main segment, the shutter abutting against the first edge in the closing off position; the first stopper is a plate comprising a main segment pressed against the inner surface, the upstream tube or the downstream tube abutting against a second rim of said main segment; the upstream tube or the downstream tube abuts against a single point of the second rim; the upstream tube or the downstream tube abuts against at least two points of the second rim; the first stopper comprises a main segment pressed against the inner surface and a second edge secured to the main segment, the second edge protruding toward the central axis relative to the main segment, the upstream tube or the downstream tube abutting against the second edge; the main segment extends over at least 60° around the central axis, preferably over at least 120°, still more preferably over at least 180°; the shutter abuts against the first stopper in the second position (freeing position); the first stopper is a plate comprising a main segment pressed against the inner surface and a narrower end part secured to the main segment, the end part having a reduced longitudinal width relative to the main segment, the shutter abutting against said first end part with a reduced width in the freeing position; the narrower end part is separated from the inner surface; the closing off position of the shutter is deduced from the freeing position by a rotation of said shutter around the rotation axis by an angle comprised between 45° and 85°, preferably between 60° and 80°.

According to a second aspect, the invention pertains to an exhaust line equipped with an element having the above features.

These and other features may be best understood from the following drawings and specification.

BRIEF DESCRIPTION OF THE DRAWINGS

Other features and advantages of the invention will emerge from the following detailed description, provided for information and non-limitingly, in reference to the appended Figures, in which.

DETAILED DESCRIPTION

Figure 1:
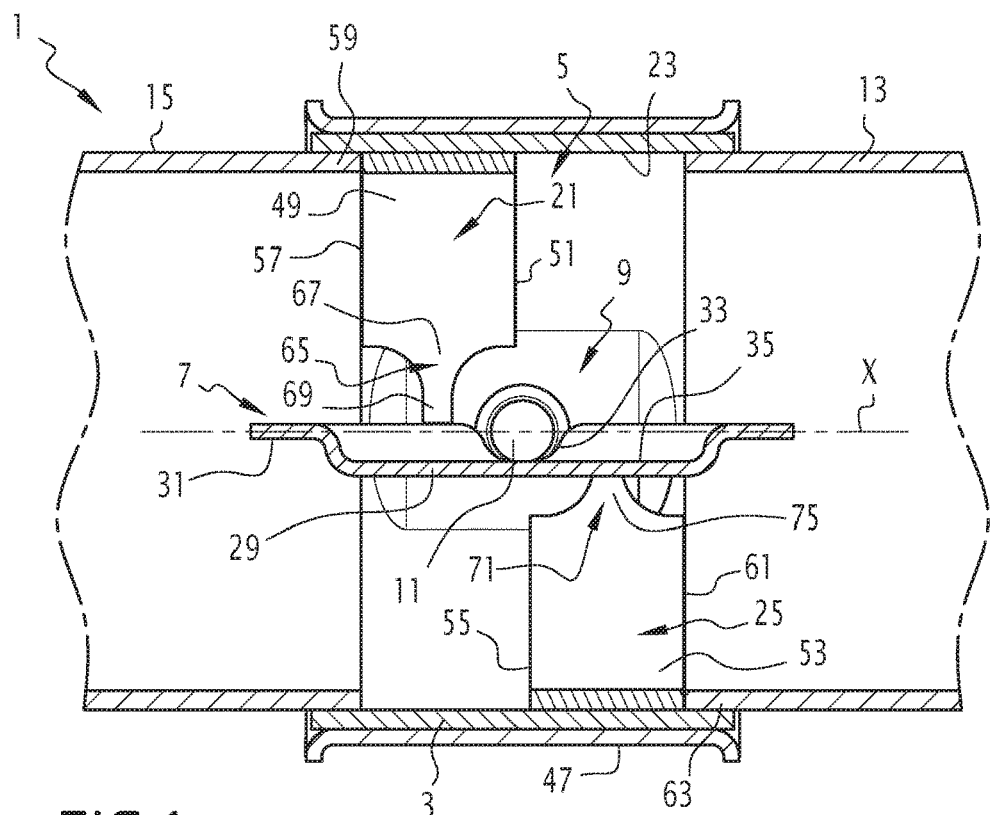
FIG. 1 is a sectional view, in a plane perpendicular to a rotation axis of a shutter, of an exhaust line element according to the invention, the shutter being in a freeing position.
Figure 2:
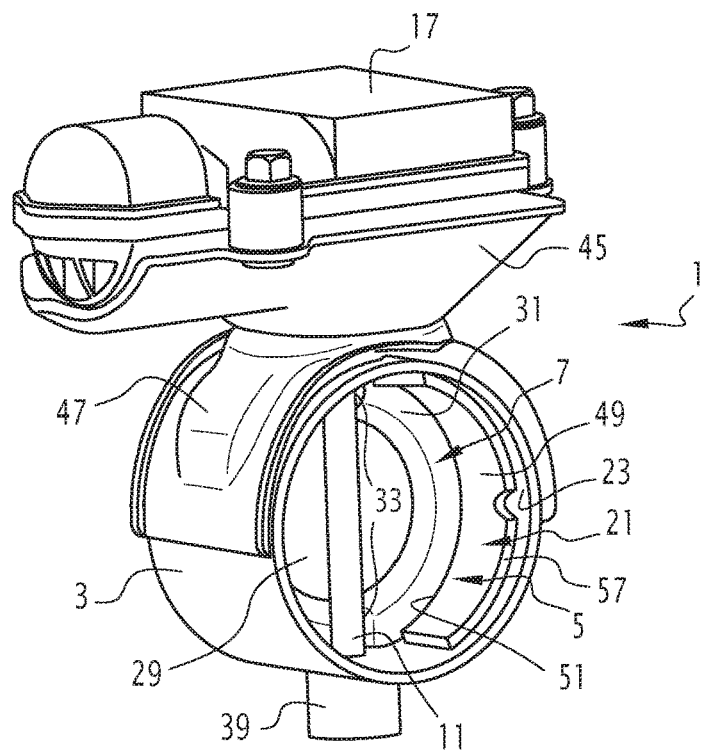
FIG. 2 is a perspective view of the exhaust line element of FIG. 1, with upstream and downstream tubes not being shown.

The exhaust line element 1 shown in FIGS. 1 and 2 is intended to be installed in a vehicle exhaust line, typically a heat engine vehicle. This vehicle is typically a motor vehicle, for example a car or truck.

The exhaust line element 1 is provided to be inserted in a segment of the exhaust line, for example serving a heat energy recovery member, or a recirculation line for recirculating exhaust gases toward the engine, or a muffler input tube, a connecting tube between two mufflers, a muffler output tube, or an exhaust outlet nozzle.

It is possible to modulate or completely interrupt the flow of exhaust gases in this segment.

As shown by FIG. 1, the exhaust line element 1 comprises a tubular valve body 3 inwardly defining a passage 5 for the exhaust gases, a shutter 7 positioned in the passage 5, and a pivot link 9 connecting the shutter 7 to the valve body 3 and arranged such that the shutter 7 is rotatable around a shaft that defines a rotation axis 11 between a position closing off the passage 5 and a position freeing the passage 5. The valve body 3 is inserted between an upstream tube 13 and a downstream tube 15, and the passage 5 fluidly connects the upstream tube 13 to the downstream tube 15.

In the present description, the terms "upstream" and "downstream" will be understood relative to the normal flow direction of the exhaust gases in the exhaust line.

The upstream tube 13 is fluidly connected in the upstream direction to a manifold capturing the exhaust gases at the outlet of the heat engine of the vehicle. The downstream tube 15 is fluidly connected in the downstream direction to a nozzle releasing the exhaust gases into the atmosphere after purification.

Figure 3:
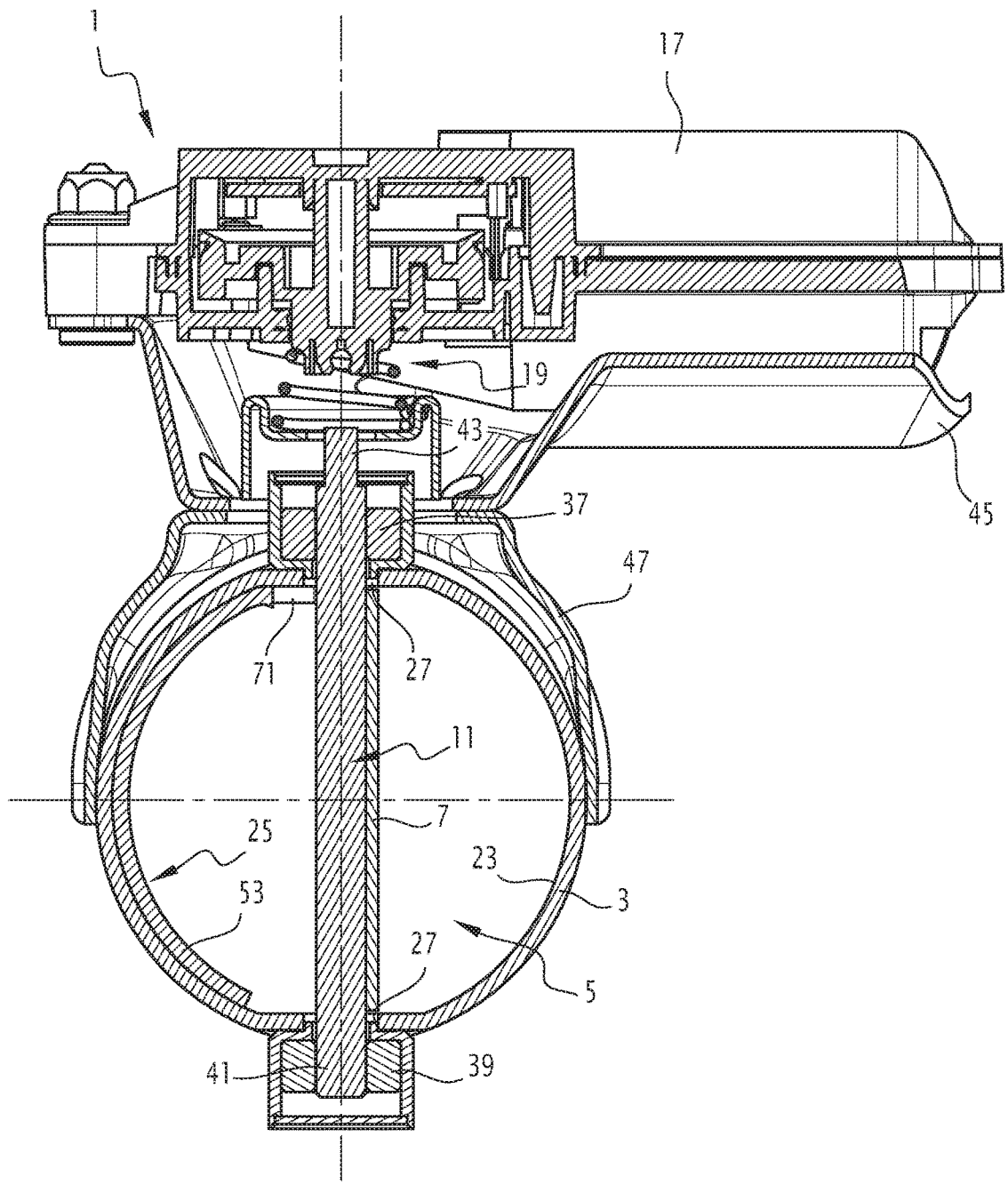
FIG. 3 is a sectional view of the exhaust line element of FIG. 2, in a plane perpendicular to the central axis of the valve body.
Figure 4:
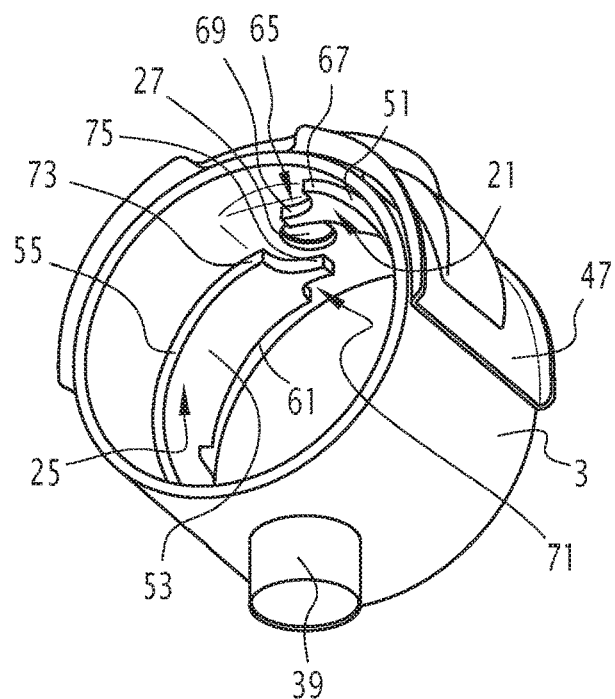
FIG. 4 is a perspective view showing the valve body, first and second stoppers, and a heat shield.

As shown in FIGS. 2 and 3, the exhaust line element 1 further includes an actuator 17 provided with an output shaft, not shown, and a transmission 19 mechanically connecting the output shaft of the actuator 17 to the shaft that defines the rotation axis 11 of the shutter 7. The actuator 17 is typically able to place the shutter 7 in a plurality of intermediate positions between the closing off and freeing positions.

Furthermore, the exhaust line element 1 includes at least one first stopper 21 attached on an inner surface 23 of the valve body 3, the shutter 7 abutting against the first stopper 21 in the closing off position.

Figure 5:
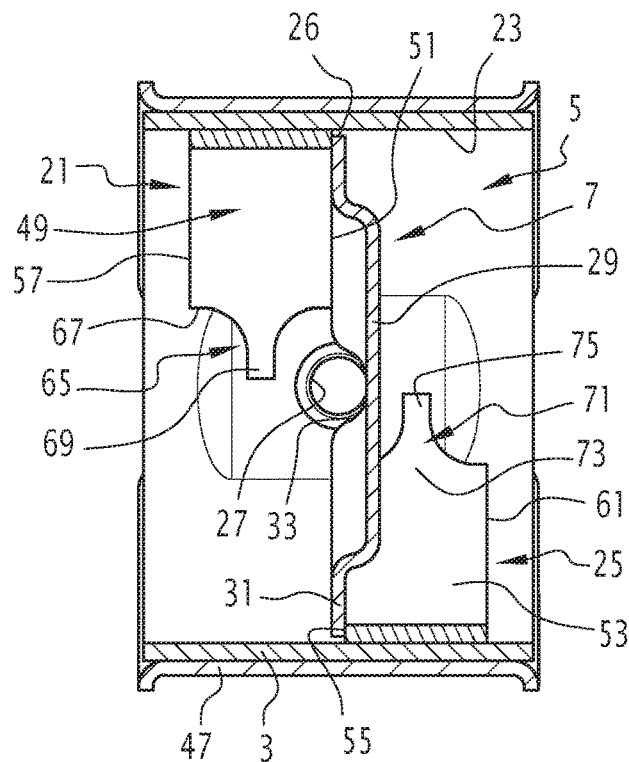
FIG. 5 is a view similar to that of FIG. 1, and shows the shutter in a closing off position without the upstream and downstream tubes.

In the example illustrated in FIGS. 1 to 5, the exhaust line element 1 comprises a second stopper 25, also attached on the inner surface 23 of the valve body 3, the shutter 7 also abutting against the second stopper 25 in the closing off position, as shown in FIG. 5.

The first stopper 21 and/or the second stopper 25 are fastened to the valve body 3 using any appropriate method or mechanism. Typically, the stoppers 21, 25 are fastened by using one of the following methods: welding with or without added metal, laser welding, electric resistance welding, seam welding, capacitor discharge welding, crimping, sintering or any other similar processes.

The valve body 3 has, perpendicular to its longitudinal central axis, a substantially constant straight section. For example, this section is circular. Alternatively, it is oval, elliptical, rectangular, square, hexagonal, or of any other appropriate shape.

The valve body 3 has two orifices 27 that are diametrically opposite relative to the central axis X. The orifices 27 are provided to receive ends of the shaft that defines the rotation axis 11 (FIG. 3).

The shutter 7 is typically a metal plate. It has a shape substantially marrying the inner section of the valve body 3. However, as shown in FIG. 5, the shutter 7 is slightly smaller than the inner section of the valve body 3, such that a narrow interstice 26 remains between the shutter 7 and the valve body 3 in the closing off position of the passage 5.

In the illustrated example, the shutter 7 has a generally circular shape.

In one example embodiment, the shutter 7 includes a substantially planar central part 29 and an annular edge or port 31 extending in a plane substantially parallel to, but slightly offset from, the central part 29. The annular edge 31 is connected to the central part 29 by a shoulder. The annular edge 31 has two indentations 33 that are diametrically opposite one another, provided to receive the shaft that defines the axis 11. The central part 29 of the shutter 7 is rigidly fastened to the shaft that defines the axis 11 by its large face 35 turned toward the edge 31. The shaft that defines the axis 11 is pressed against the large face 35, and is engaged in the indentations 33.

The pivot link 9 typically includes two bearings 37, 39 placed outside the valve body 3, around orifices 27 (FIG. 3). A lower end 41 of the axis 11 traverses one of the orifices 27 and is guided in rotation in the bearing 39. An upper end 43 of the axis 11, opposite the lower end 41, traverses the other orifice 27 and is guided in rotation in the bearing 37. The shaft that defines the upper end 43 of the axis 11 protrudes beyond the bearing 37, and is connected to the transmission 19, as shown in FIG. 3. Alternatively, the element of the exhaust line 1 includes only one bearing.

In the illustrated example embodiment, the actuator 17 is rigidly fastened to the valve body 3 by a tab 45. A heat shield 47 is inserted between the actuator 17 and the valve body 3.

As indicated above, the shutter 7 abuts against the first and second stoppers 21, 25 in the closing off position. Alternatively, the shutter 7 only abuts against the first stopper 21 or against the second stopper 25 in the closing off position.

In the example shown in FIGS. 1 to 6, the first and second stoppers 21, 25 have the same shape.

The first and/or second stoppers 25 are plates, typically metal plates. They are in particular made from stainless steel, for example of type 1.4301, 1.4401, 1.4404, 1.4571, 1.4512, 1.4510, 1.4509, 1.4513, 1.4526.

The first stopper 21 comprises a main segment 49, pressed against the inner surface 23 of the valve body. This main segment 49 therefore marries the shape of the inner surface 23. In the illustrated example, the main segment 49 is in the shape of an arc of circle.

The main segment 49 typically extends over at least 60° around the central axis, preferably over at least 120°, and still more preferably over at least 180°.

In the example illustrated in FIGS. 1 to 5, the main segment 49 extends over about 180° around the central axis.

The first stopper 21 is placed longitudinally between the rotation axis 11 and the downstream tube 15. The second stopper 25 is placed longitudinally between the rotation axis 11 and the upstream tube 13. Circumferentially, the first stopper 21 extends from one of the orifices 27 to the other orifice 27, over half of the circumference of the valve body 3. Likewise, the second stopper 25 extends circumferentially from one of the orifices 27 to the other orifice 27, over the other half of the circumference of the valve body 3. Thus, considered together, the first and second stoppers 21, 25 extend over substantially the entire circumference of the valve body 3.

As a general rule, and irrespective of the circumferential length of the first and second stoppers 21, 25, these first 21 and second 25 stoppers are placed across from one another, i.e., diametrically opposite one another.

The main segment 49 of the first stopper 21 has, toward the upstream tube 13, a first rim 51. The shutter 7, in its closing off position, abuts against this first rim 51. In the example shown in FIGS. 1 to 5, the first rim 51 extends in a plane substantially perpendicular to the central axis X.

Figure 6:
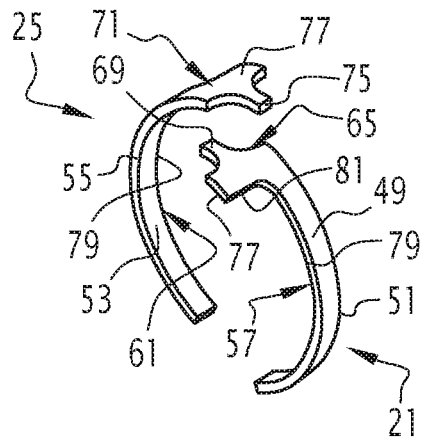
FIGS. 6 to 14 are views showing different alternative embodiments of the first and second stoppers.

Like the first stopper 21, the second stopper 25 also includes a main segment 53 pressed against the inner surface 23. The main segment 53 is defined toward the downstream tube 15 by a first rim 55. The shutter 7, as illustrated in FIG. 6, abuts against this first rim 55 in the closing off position. In the example shown in FIGS. 1 to 5, the first rim 55 extends in a plane substantially perpendicular to the central axis X.

In the closing off position, the annular part 31 of the shutter 7 is thus in contact both with the first rim 51 of the first stopper 21 and with the first rim 55 of the second stopper 25. It is in contact with the first rim 51 by a face turned toward the downstream tube 15 and with the first rim 55 by a face turned toward the upstream tube 13.

The first rims 51 and 55, together, extend over nearly the entire perimeter of the valve body 3. The first rims 51 and 55 together cover the entire perimeter of the valve body 3, with the exception of the orifices 27, and of a space with a small circumferential width on either side of each orifice 27.

Thus, in the closing off position, excellent sealing is obtained between the shutter 7 and the valve body 3.

This is also due to the fact that the first rims 51 and 55 are both arranged in planes substantially perpendicular to the central axis X, such that in its rotational movement from the freeing position to the closing off position, the shutter 7 comes alongside the first rims 51 and 55 in a direction close to the perpendicular to these first rims 51 and 55.

Furthermore, the first stopper 21 defines the longitudinal position of the downstream tube 15 relative to the valve body 3.

Preferably, the second stopper 25 defines the longitudinal position of the upstream tube 13 relative to the valve body 3.

Indeed, the main segment 49 of the first stopper 21 is defined toward the downstream tube 15 by a second rim 57. The downstream tube 15 has a longitudinal end 59 engaged in the valve body 3 and abutting longitudinally against the second rim 57. The longitudinal end 59 outwardly has a shape marrying the inner section of the valve body 3.

The second rim 57 extends in a plane substantially perpendicular to the central axis X.

Likewise, the main segment 53 of the second stopper 25 has, toward the upstream tube 13, a second rim 61. The upstream tube 13 abuts against the second rim 61. More specifically, the upstream tube 13 has a longitudinal end 63 engaged in the valve body 3 and longitudinally abutting against the second rim 61. The longitudinal end 63 outwardly has a shape marrying the inner section of the valve body 3.

The second rim 61 extends in a plane substantially perpendicular to the central axis X.

Furthermore, and as illustrated in FIG. 1, the shutter 7 abuts at least against the first stopper 21 in the freeing position. Thus, it is the first stopper 21 that defines the freeing position of the shutter 7.

Preferably, the shutter 7 in the freeing position also abuts against the second stopper 25.

Typically, in the freeing position, the shutter 7 extends in a plane including the central axis X of the valve body 3. The shutter 7 is therefore parallel to the exhaust gas stream traversing the valve body 3. It extends in a plane that includes both the rotation axis 11 and the central axis X (FIG. 1).

In other words, the shutter 7 typically goes from the closing off position to the freeing position by an angular travel of about 90° in rotation around the rotation axis 11.

Alternatively, the freeing position is different from that shown in FIG. 1. The shutter 7 is not arranged in a plane containing the central axis X, but in a plane forming an angle relative to the central axis X.

In the example shown in FIGS. 1 to 5, the first stopper 21 comprises, aside from the main segment 49, an end part 65 narrower than the total width of the stopper 21, secured to the main segment 49, the shutter 7 abutting against said narrower end part 65 in the freeing position.

Advantageously, the contact between the shutter 7 and the narrower end part 65 is situated at a distance from the rotation axis 11 of at least 10% to 15% of the inner diameter of the valve body 3.

Typically, the distance between the rotation axis 11 and the narrower end part 65 is comprised between 50% and 100% of the width of the stopper 21, preferably between 75% and 100% of said width. The distance and the width are considered along the central axis X.

The separation of this contact point between the stopper 21 and the shutter 7 relative to the rotation axis of the shutter improves the angular precision of the position of the shutter 7 in the freeing position. This makes it possible to reduce the pressure losses in the exhaust gas and improves the power and fuel consumption performance of the engine. The narrower end part 65 has a base 67 (FIG. 1) secured to the main segment 49 and a narrower zone 69. The width of the end part 65, considered along the central axis X, becomes narrower from the base 67 moving toward the narrower zone 69.

The end part 65 circumferentially extends the main segment 49. The narrower zone 69 therefore constitutes the circumferential end of the end part 65, opposite the main segment 49.

In the example shown in FIGS. 1 to 5, the narrower end part 65 is a zone of the plate constituting the first stopper 21. The narrower end part 65 is pressed against the inner surface 23 of the valve body 3.

The narrower end part 65 is machined or cut, such that the narrower zone 69 thus offers a contact zone with the shutter 7 in the freeing position separated from the rotation axis of the shutter 7.

The second stopper 25 has substantially the same shape. It also includes a narrower end part 71, secured to the main segment 53. The narrower end part 71 has a base 73 secured to the main segment 53 and a narrower zone 75 against which the shutter 7 bears in the freeing position. The narrower end part 71 is formed in the plate making up the second stopper 25. The narrower end part 71 has a width that decreases from the base 73 moving toward the contact zone with the shutter 7, this width being considered parallel to the central axis X. The narrower zone 75 is machined or cut so as to arrange a contact separated from the rotation axis of the shutter 7.

The narrower end part 71 circumferentially extends the main segment 53. The narrower zone 75 constitutes the circumferential end of the part 71, opposite the main segment 53.

The narrower end part 71 is pressed against the inner surface 23. The narrower zones 69 and 75 point in circumferential directions opposite one another. As shown in FIG. 5, the narrower zones 69 and 75 are arranged on either side of the rotation axis 11, along the direction of the central axis X. They are slightly separated from the rotation axis 11. The shutter 7, in its rotational movement toward the freeing position, comes alongside tips of the narrower zones 69 and 75 by its annular edge 31. The face of the edge 31 turned toward the downstream tube 15 in the closing off position comes alongside and against the tip of the narrower zone 69. The opposite face, turned toward the upstream tube 13 in the closing off position, comes alongside and against the narrower zone 75. The coming alongside is done in a direction substantially perpendicular to the shutter 7.

Because the contact with the stoppers 21, 25 has a narrower width, the position of the shutter 7 in the freeing position is controlled particularly precisely.

It should be noted that, in the above description, it was indicated that the first stopper 21 defined the longitudinal position of the downstream tube 15, and was therefore situated between the downstream tube 15 and the axis 11. Alternatively, the first stopper 21 makes it possible to define the longitudinal position of the upstream tube 13, and is therefore situated between the axis 11 and the upstream tube 13.

In this case, the second stopper 25 is provided to define the longitudinal position of the downstream tube 15 relative to the valve body 3, and is situated between the downstream tube 15 and the axis 11.

According to an alternative embodiment, the element 1 only includes the first stopper 21, and does not include the second stopper 25. In this case, the closing off position of the shutter 7 is defined only by the first stopper 21. Typically, the freeing position is defined only by the first stopper 21. The first stopper 21 further serves to define the longitudinal position of one of the upstream tube 13 and the downstream tube 15, the other of the upstream tube 13 and the downstream tube 15 having its longitudinal position relative to the valve body 3 defined by any other appropriate method.

Alternative embodiments of the first and second stoppers will now be described in reference to FIGS. 6 to 14.

Only the differences between these alternatives and that of FIGS. 1 to 5 will be outlined below. Identical elements or elements performing the same function will be designated using the same references.

In the alternative of FIG. 6, the downstream tube 15 abuts against a single point of the second rim 57 of the first stopper 21.

Likewise, the upstream tube 13 abuts against a single point of the second rim 61 of the second stopper 25. A single point refers to the fact that the upstream 13 or downstream 15 tube is only in contact with a single portion 77 of the second rim 57 or 61, this portion 77 being short relative to the total length of the second rim 57, 61, as illustrated in FIG. 6. The portion 77 typically represents less than 10% of the total length of the second rim 57, 61, considered circumferentially, i.e., in a plane perpendicular to the central axis X.

To that end, the second rim 57, 61 of each of the two stoppers 21, 25 includes, aside from the portion 77, another portion 79 connected to the portion 77 by a shoulder 81 oriented substantially parallel to the central axis X. The portion 79 is longitudinally offset toward the rotation axis 11 relative to the portion 77. In other words, the main segment 49, 53 has a relatively smaller width at the portion 79, and relatively larger the portion 77, the width being considered along the central axis X.

In the illustrated example, the portion 77 is situated at the circumferential end of the main segment 49, 53 connected to the tip-shaped end part 65, 71. Alternatively, the portion 77 is situated circumferentially opposite the tip-shaped end part. According to still another alternative, it is situated away from both circumferential ends of the main segment. In this case, the second rim includes two portions 79 offset toward the rotation axis 11, situated on either side of the portion 77.

The alternative embodiment of FIG. 6 has the advantage that the quantity of material used for each of the two stoppers is extremely reduced.

According to another alternative embodiment, the downstream tube 15 abuts against two points of the second rim 57 of the first stopper. Likewise, the upstream tube 13 abuts against two points of the second rim 61 of the second stopper 25. Thus, the second rim 57 has two portions similar to the portion 77 shown in FIG. 6, with a portion 79 between the two portions 77 and optionally portions 79 on either side of the two stoppers.

According to still another alternative, the upstream tube or the downstream tube abuts against more than two points of the corresponding second rim, for example three points that are 120° from one another.

Figure 7:
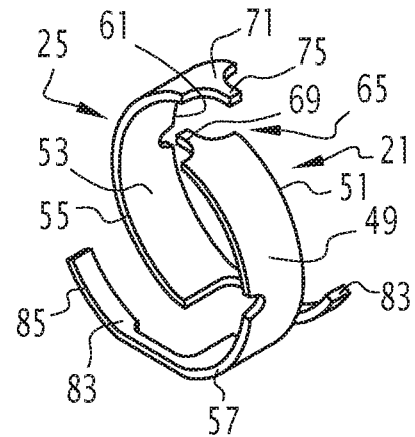

In the alternative embodiment of FIG. 7, the contact between the downstream tube 15 and the first stopper 21 extends over an angular sector larger than 180° around the central axis X. In the example of FIG. 7, the contact between the first stopper 21 and the downstream tube 15 extends over about 240°.

Likewise, the contact between the second stopper 25 and the upstream tube 13 is done over more than 180°, and over about 240° in the illustrated example.

To that end, the first stopper 21 includes an appendage 83 secured to the main segment 49. This appendage 83 extends the main segment 49 circumferentially opposite the tip-shaped end part 65. The appendage 83 is pressed against the inner surface 23 of the valve body 3. It has a reduced width, considered along the central axis X, relative to the main segment 49. The rim 85 of the appendage 83, turned toward the downstream tube 15, extends the second rim 57 of the main segment. The rims 85 and 57 fit in the same plane perpendicular to the central axis X.

The second stopper 25 has an appendage 83 arranged in the same way as that of the first stopper 21.

In this alternative embodiment, the positioning of the upstream tube and/or the downstream tube relative to the valve body 3 is more precise.

Figure 8:
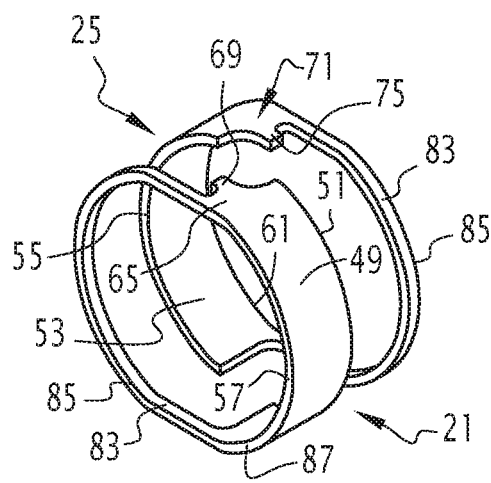

According to the alternative embodiment shown in FIG. 8, the contact between the first stopper 21 and the downstream tube 15 is done over the entire perimeter of the valve body 3 and therefore over the perimeter of the downstream tube 15. To that end, the first stopper 21 includes an appendage 83 similar to that described in reference to FIG. 7, but longer. The appendage 83 extends from the circumferential end 87 of the main segment 49 opposite the tip-shaped end part 65. It extends circumferentially around the central axis X up to the tip-shaped end part 65 and is secured to this tip-shaped end part 65. Thus, the appendage 83 and the main segment 49 together form a ring with a closed contour, surrounding the main axis X over 360°. The appendage 83 is pressed against the inner surface 23 of the valve body, over its entire periphery. The rim 85 of the appendage and the second rim 57 form an annular surface with a closed contour, fitting in a plane perpendicular to the central axis X.

Advantageously, the second stopper 25 has the same structure, and includes an appendage 83 having the same shape as that of the first stopper 21.

Thus, in this alternative embodiment, the longitudinal positioning of the upstream tube and/or the downstream tube relative to the valve body is extremely precise. In particular, it is much easier to arrange the upstream and/or downstream tubes coaxially with the valve body. Furthermore, this alternative avoids the risk of whistling noises related to the presence of an edge of the outlet tube facing the exhaust gas streams.

Figure 9:
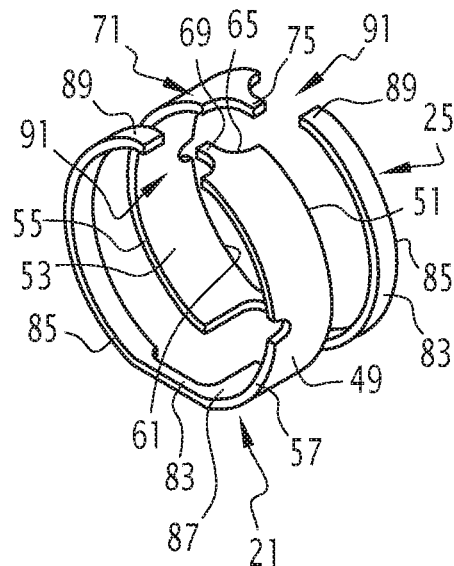

In the alternative of FIG. 9, the first and/or second stoppers 21, 25 are arranged so as to have a certain elasticity, facilitating the insertion of the stoppers inside the valve body.

As shown in FIG. 9, the appendage 83 of the first stopper 21 extends practically from the circumferential end 87 of the main segment 49 up to the tip-shaped end part 65, but is not connected to the tip-shaped end part 65. An interstice 91 with a smaller circumferential width remains between the free end 89 of the appendage 83 and the tip-shaped end part 65. When idle, the first stopper 21 has an outer section substantially corresponding to the inner section of the valve body. However, it is possible to deform the appendage 83 slightly, elastically, in particular in flexion toward the center of the first stopper 21. This facilitates the placement of the first stopper 21.

The second stopper 25 advantageously has the same structure, the free end 89 of the appendage 83 being separated from the tip-shaped end part 71 by an interstice 91 with a small circumferential width.

Figure 10:
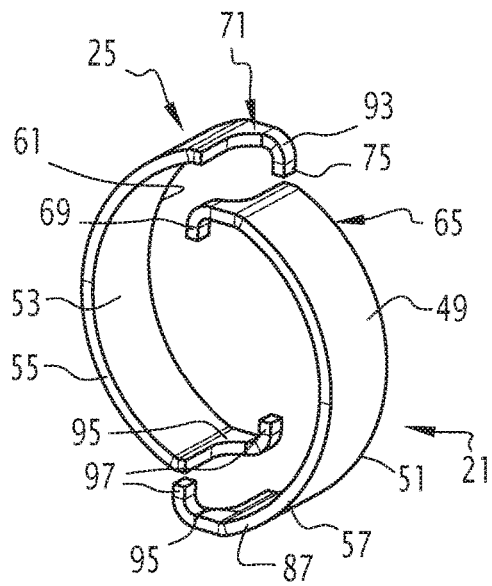

In the alternative embodiment shown in FIG. 10, the narrower zone 69 of the first stopper 21 is separated from the inner surface 23 of the valve body 3. For example, the narrower zone 69 extends along a practically radial direction toward the central axis X. Thus, the shutter 7 in the freeing position comes alongside not the rim of the narrower end part 65, but over a larger face 93 of the tip-shaped end part 65. The contact between the first stopper 21 and the shutter 7 can then be further from the rotation axis of the shutter, typically 20 to 25% of the inner diameter of the valve body 3.

Advantageously, the second stopper 25 is configured in the same way, the narrower zone 75 also moving away from the inner surface 23 of the valve body 3.

According to another alternative embodiment shown in FIG. 10, the first stopper 21 has a second narrower end part 95, secured to the main segment 49. The second narrower end part 95 is secured to the circumferential end 87 of the main segment 49. Typically, it has the same shape as the narrower end part 65. In the illustrated example, the narrower zone 97 of the second narrower end part 95 is also separated from the inner surface 23. It is substantially aligned with the narrower zone 69. Thus, the shutter 7 in the freeing position comes alongside and against both narrower zones 69 and 97 at the same time.

The narrower end part 95 circumferentially extends the main segment 49, opposite the narrower end part 65. The main segment 49 and the two narrower end parts 65, 95 are typically integral with one another and are made in a same metal plate.

The second stopper 25 advantageously has the same structure as the first stopper 21.

Figure 11:
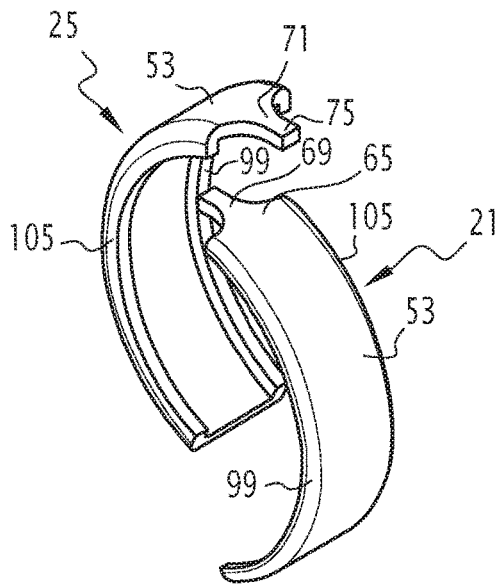

According to the alternative embodiment shown in FIG. 11, the first stopper 21 includes, aside from the main segment 49, a second edge 99 secured to the main segment 49. The second edge 99 protrudes toward the central axis X relative to the main segment 49. It extends in a plane substantially perpendicular to the central axis X. The downstream tube 15 abuts against the second edge 99.

The second edge 99 extends over the entire circumferential length of the main segment 49.

Advantageously, the second stopper 25 has the same structure as the first stopper, and also includes a second edge 99.

Figure 12:
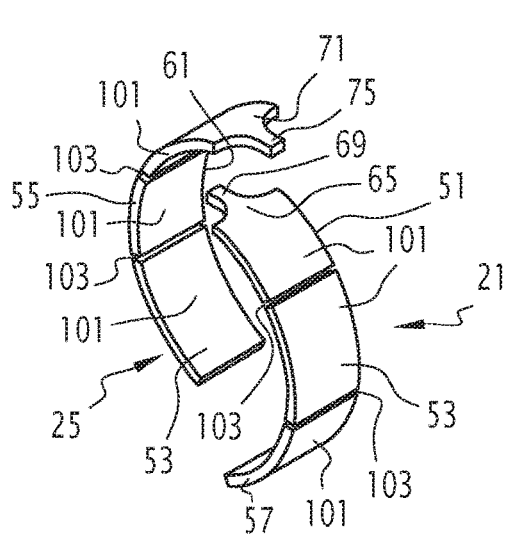

According to the alternative embodiment shown in FIG. 12, the main segment 49 of the first stopper 21 is not a single-piece, integral plate.

On the contrary, as shown in the Figure, the main segment 49 includes several separate parts 101 that are mechanically independent of one another. These parts 101 are not directly connected to one another by material bridges or fastening members. They are each rigidly fastened on the inner surface 23 of the valve body 3. In the illustrated example, the main segment 49 is divided into three parts 101, by interstices 103 extending parallel to the central axis X. Each part 101 therefore corresponds to a circumferential sector of the main segment 49. One of the parts 101 is secured to the tip-shaped end part 65. Alternatively, the main segment 49 is divided into two pieces 101 only, or more than three pieces 101.

The interstices 103 are not necessarily lines parallel to the central axis X, but may have any type of orientation.

Advantageously, the second stopper 25 has the same structure as the first stopper 21, its main segment 53 also being subdivided into several parts 101 separated by interstices 103.

Figure 13:
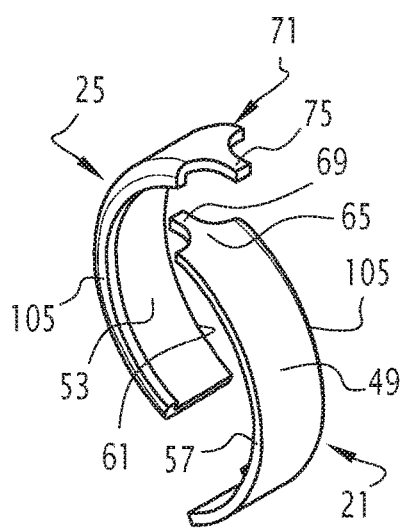

According to the alternative embodiment shown in FIG. 13 and in FIG. 11, the first stopper 21 comprises, aside from the main segment 49, a first edge 105 secured to the main segment 49. The first edge 105 protrudes toward the central axis X relative to the main segment 49 and extends in a plane substantially perpendicular to the central axis X. The shutter 7 abuts against the first edge 105 in its closing off position.

Typically, the first edge 105 extends circumferentially over the entire circumferential length of the main segment 49.

Advantageously, the second stopper 25 has the same structure as the first stopper, and also includes a first edge 105.

This alternative embodiment improves the sealing between the valve body and the shutter in the closing off position.

Figure 14:
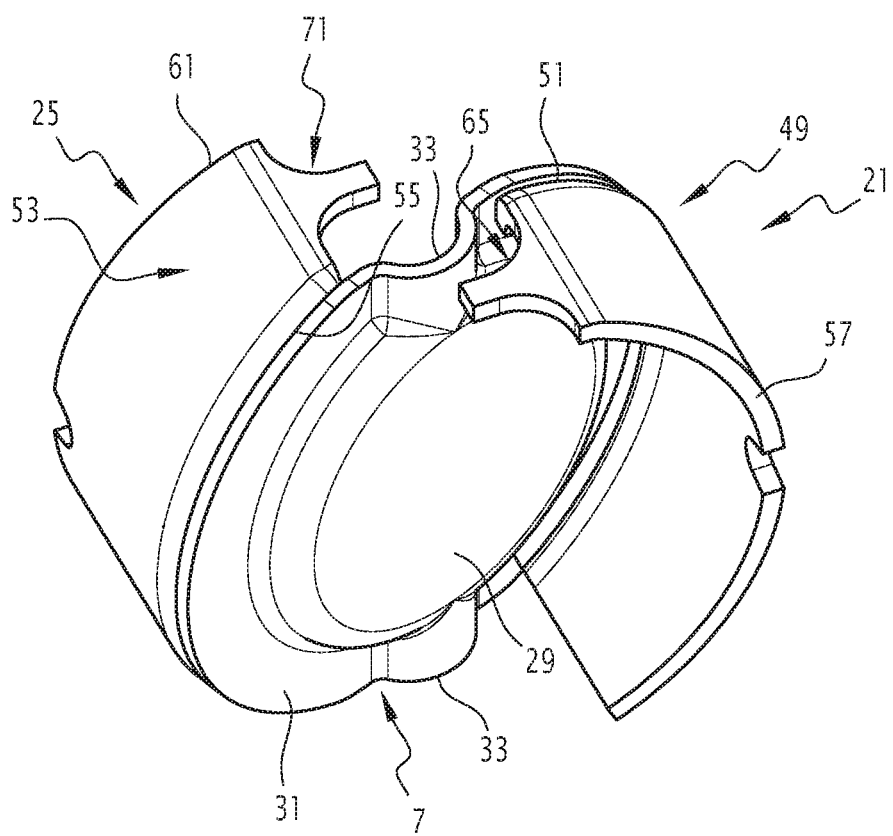

In the alternative embodiment of FIG. 14, the closing off position of the shutter 7 is deduced from the freeing position by a rotation of said shutter 7 around the rotation axis 11 by an angle comprised between 45° and 85°, preferably between 60° and 80°, and still more preferably comprised between 68° and 72°. Thus, the shutter 7 in the closing off position does not extend in a plane perpendicular to the central axis X of the valve body 3. It extends in a determined inclined plane, for example forming an angle comprised between 5° and 45° with the central axis X, preferably between 30° and 40°, still more preferably between 28° and 32°.

This result is obtained by arranging the rim 51 of the main segment of the first stopper 21 and/or the rim 55 of the main segment of the second stopper 25 in said determined inclined plane.

Alternatively, the first stopper 21 and/or the second stopper 25 have a first edge 105 of the type described in reference to FIGS. 11 and 13, extending in said determined inclined plane.

The travel of the shutter 7 between its closing off and freeing positions is thus reduced. The response time of the exhaust line element is shorter. This also allows the use of reduced-travel actuators.

It should be noted that the first and second stoppers are fastened to the valve body permanently, which guarantees good sealing against exhaust gases between these stoppers and the valve body.

Furthermore, because the shutter 7 in the closing off position comes alongside and against surfaces protruding toward the inside of the passage 5 relative to the inner surface 23 of the valve body 3, the section of the shutter is chosen to be significantly smaller than the inner section of the valve body 3. This decreases the risk of jamming of the shutter 7, in particular in the closing off position.

In particular, there is no direct contact between the shutter 7 and the valve body 3. This is particularly important, jamming of the shutter 7 being observed during temperature changes on the valves of the state of the art.

Furthermore, in the invention, it is possible to adjust the longitudinal positions of the narrower zones 69, 75 along the central axis X relative to the rotation axis 11. The separation between the narrower zones 69, 75 and the rotation axis 11 can be chosen to be large enough to ensure precise positioning of the shutter 7 in its freeing position.

This contributes to increasing the precision of the positioning of the shutter 7 in the freeing position.

The fact that the upstream and downstream tubes 13 and 15 are positioned by abutting against the first and second stoppers 21 and 25 makes it possible to prevent the tubes from involuntarily coming into contact with the shutter or the rotation axis 11 during the insertion of the tubes into the valve body 3.

The valve body 3 has an extremely regular shape, and does not require machining or any other form of complex mechanical processing. It is therefore particularly inexpensive.

It should be noted that the different alternatives of the first and second stoppers can be combined with one another, on the condition that they are technically compatible.

The invention claimed is:

1. An exhaust line element comprising:
    a tubular valve body inwardly defining a passage for exhaust gases, the tubular valve body having a longitudinal central axis;
    a shutter positioned in the passage;
    a pivot link connecting the shutter to the tubular valve body, and arranged such that the shutter is rotatable around a rotation axis between a first position closing off the passage and a second position freeing the passage;
    an upstream tube and a downstream tube between which the valve body is inserted, the passage fluidly connecting the upstream tube to the downstream tube, the upstream tube and the downstream tube being located respectively at predetermined first and second longitudinal positions with respect to the valve body;
    at least one first stopper attached on an inner surface of the valve body, the shutter abutting against the first stopper in the first position;
    wherein at least one of the upstream tube and the downstream tube abuts longitudinally against the first stopper, and wherein the first stopper defines the first longitudinal position of the upstream tube or the second longitudinal position of the downstream tube relative to the valve body.

2. The exhaust line element according to claim 1, including a second stopper attached on the inner surface of the valve body, the second stopper defining the longitudinal position of the other of the upstream tube and the downstream tube relative to the valve body.

3. The exhaust line element according to claim 1, wherein the first stopper is a plate comprising a main segment pressed against the inner surface, the main segment having a first rim, the shutter abutting against the first rim in the first position.

4. The exhaust line element according to claim 1, wherein the first stopper comprises a main segment pressed against the inner surface and a first edge secured to the main segment, the first edge protruding toward the longitudinal central axis relative to the main segment, the shutter abutting against the first edge in the first position.

5. The exhaust line element according to claim 1, wherein the first stopper is a plate comprising a main segment pressed against the inner surface, and wherein the upstream tube or the downstream tube abuts against a second rim of the main segment.

6. The exhaust line element according to claim 5, wherein the upstream tube or the downstream tube abuts against a single point of the second rim.

7. The exhaust line element according to claim 5, wherein the upstream tube or the downstream tube abuts against at least two points of the second rim.

8. The exhaust line element according to claim 1, wherein the first stopper comprises a main segment pressed against the inner surface and an edge secured to the main segment, the edge protruding toward the longitudinal central axis relative to the main segment, and wherein the upstream tube or the downstream tube abuts against the edge.

9. The exhaust line element according to claim 3, wherein the main segment extends over at least 60° around the longitudinal axis.

10. The exhaust line element according to claim 1, wherein the shutter abuts against the first stopper in the second position.

11. The exhaust line element according to claim 10, wherein the first stopper is a plate comprising a main segment pressed against the inner surface and a narrower end part secured to the main segment, the narrower end part having a reduced longitudinal width relative to the main segment, the shutter abutting against the narrower end part with a reduced width in the second position.

12. The exhaust line element according to claim 11, wherein the narrower end part is separated from the inner surface.

13. The exhaust line element according to claim 1, wherein the first position of the shutter is deduced from the second position by a rotation of the shutter around the rotation axis by an angle comprised between 45° and 85°.

14. The exhaust line element according to claim 1, wherein at least one of the upstream tube and downstream tube has a longitudinal end that is inserted inside the tubular valve body.

15. The exhaust line element according to claim 1, wherein the tubular valve body has a first longitudinal tubular end and a second longitudinal tubular end opposite of the first longitudinal tubular end, and wherein a longitudinal end of the upstream tube is inserted in one of the first and second longitudinal tubular ends and is pressed against an inner surface of the one of the first and second longitudinal tubular ends.

16. The exhaust line element according to claim 1, wherein the tubular valve body has a first longitudinal tubular end and a second longitudinal tubular end opposite of the first longitudinal tubular end, and wherein a longitudinal end of the downstream tube is inserted in one of the first and second longitudinal tubular ends and is pressed against an inner surface of the one of the first and second longitudinal tubular ends.

17. The exhaust line element according to claim 1, wherein the upstream tube has a longitudinal end defining a rim that abuts longitudinally against the first stopper.

18. The exhaust line element according to claim 1, wherein the downstream tube has a longitudinal end defining a rim that abuts longitudinally against the first stopper.

19. The exhaust line element according to claim 1, wherein the tubular valve body has a first longitudinal tubular end and a second longitudinal tubular end opposite of the first longitudinal tubular end, and wherein a longitudinal end of the upstream tube is surrounded by the first longitudinal tubular end and a longitudinal end of the downstream tube is surrounded by the second longitudinal tubular end, and wherein the longitudinal end of the upstream tube abuts directly against the first stopper.

20. The exhaust line element according to claim 19, wherein the first stopper defines the first longitudinal position of the upstream tube, and including a second stopper attached on the inner surface of the tubular valve body wherein the longitudinal end of the downstream tube abuts directly against the second stopper to define the second longitudinal position of the downstream tube.

* * * * *